United States Patent

[11] 3,615,589

[72] Inventor Paulus Jacob Spek
     Didam, Netherlands
[21] Appl. No. 15,215
[22] Filed Feb. 27, 1970
[45] Patented Oct. 26, 1971
[73] Assignee Lever Brothers Company
     New York, N.Y.
[32] Priority Apr. 15, 1966
[33] Great Britain
[31] 16604/66
     Continuation-in-part of application Ser. No. 629,412, Apr. 10, 1967, now abandoned.

[54] METHOD OF SUBDIVIDING WATER THIN BULK FOOD MATERIAL
10 Claims, No Drawings

[52] U.S. Cl....................................................... 99/124

[51] Int. Cl.......................................................... A23l 1/34, A23l 1/40
[50] Field of Search............................................99/124, 182

[56] References Cited
FOREIGN PATENTS
926,502  5/1963  Great Britain................  99/124

Primary Examiner—Raymond N. Jones
Assistant Examiner—J. M. Hunter
Attorneys—Louis F. Kline, Jr., Melvin H. Kurtz and Edgar E. Ruff ABSTRACT: A method of subdividing bulk food material into portions, said bulk food material comprising a mixture of liquid and particulate solid components which would tend to separate on standing, wherein the homogeneity of said mixture is maintained during the subdividing step by employing a suitable thickening agent which is subsequently decomposed.

METHOD OF SUBDIVIDING WATER THIN BULK FOOD MATERIAL

This application is a continuation-in-part of applicant's copending application Ser. No. 629,412, filed Apr. 10, 1967, now abandoned.

The present invention relates to a process for obtaining portions of composite material and more particularly to a process for obtaining portions of material, composed of a liquid phase of low viscosity when in the ready-for-use condition and of particulate solid material, by dividing a composite bulk material into portions, said portions having substantially the same ratio of the materials.

During dividing of a bulk material composed of a liquid phase of low viscosity and particulate solid material into portions, dehomogenization may occur by sedimentation and/or flotation of the solid material in such a way that the portions will not contain the same ratio of the components. A thickening agent could be added to increase the viscosity of the liquid phase to such an extent that dehomogenization is obviated for all practical purposes. However, the relatively high viscosity which is thus imparted to the composite bulk material is not desired in the end product.

This problem arises, for example in the production of packaged foodstuffs such as soups. Liquid packaged soups often contain, as well as a homogeneous liquid phase, solid piecemeal material like noodles, pieces of meat and of vegetables. If all the solid ingredients are added to the liquid phase before the containers, for example tins, are filled, dehomogenization may occur by settling or floating of the solid ingredients to such an extent that different containers may contain quantities of solid material which vary too much. The degree of dehomogenization will of course depend on the nature, shape and size of the solid ingredients, as well as on the viscosity of the soup in question.

The difficulty mentioned is particularly of importance with composite products, for example soups, that are preferred to be "water-thin" in the ready-for-use condition, which means that the liquid phase must be of low viscosity when it is used (i.e. consumed in the case of edibles), as the case may be after having been diluted.

Soup is, for example, often packed in tins in a concentrated condition so that before consumption it must be diluted, for instance 1:1.

To circumvent the problem of dehomogenization during and before the method of dividing a composite bulk material into portions, such as the method of filling a series of containers with a composite soup material, it has often been customary to dose by hand in each container separately the solid ingredients (such as meat cubes) which are most liable to settle. As each of the solid ingredients (such as noodles) could not be measured out in a practical and economic way and added by hand, a thickening agent was often added to the liquid phase to prevent dehomogenization during the dividing step. For this reason the soup ultimately obtained in a ready-for-use condition did not have the preferred and desired thinness.

It is an object of the invention to provide a method for obtaining portions of composite material composed of a liquid phase of low viscosity when in the ready-for-use condition between about 1 and 20, usually between 1 and 10 and preferably between 1 and 5 cP) and of particulate solid material such that the portions have substantially the same ratio of the materials.

Another object of the invention provides a method for producing a series of containers, each containing a liquid phase of low viscosity when in the ready-for-use condition and particulate solid material. Other objects will be clear from the description.

The method according to the present invention is suited to full mechanical application.

According to the invention portions of a substantially water-thin food material having an aqueous phase and a particulate solid phase are obtained by the steps of mixing the substantially water-thin bulk food material with a thickening amount of a decomposable thickening agent, distributing the solid phase substantially uniformly throughout the aqueous phase, thereby forming a thickened bulk material of uniform particulate solids content, subdividing the thickened bulk material into portions, each having substantially the same relative proportions of aqueous and particulate phases and subsequently decomposing the thickening agent, thereby converting said portion into a ready-for-use condition.

The thickening agent can be decomposed in a number of ways, preferably by heating a heat-labile thickening agent or by the addition of an adequate product which in most cases will be added to each portion after the dividing step of the bulk material, but can also be added to the bulk material provided that it will substantially decompose the thickening agent after the dividing step; to this end the product can be added in an encapsulated condition to the bulk material, the product being freed from its encapsulated condition after the dividing step.

According to the present invention portions of composite material can be obtained, which in a ready-for-use condition are "water-thin" but may be marketed in a solid to semisolid state, for example, in a frozen condition, such as beverages, custard, desserts or entrees, for example cereals in extracts or milk, composite chocolate and the like drinks. Such portions can be converted into the ready-for-use condition, for example, by thawing or heating. Thus starches can be used as a thickening agent for such frozen products which thickening agent can be disintegrated by amylase. The amylase may be added for example, in encapsulated form, so that it will exert its disintegrating action at a later moment by raising the temperature. It is also possible to make a frozen dessert or custard (with for example cherries or other fruits as the solid material) with an adequate thickening agent and spraying amylase on the frozen product which will also freeze to a solid film or droplets on the frozen product; in the form of a frozen film or droplets it will not exert disintegrating action on the thickening agent, but as soon as the product is melted and especially warmed up, it will disintegrate the thickening agent so as to obtain a thin dessert or custard with for example that fruit as solid material in it. of an amylase which is stable to a low pH has to be used when the product as such has a low pH. It is preferred to use a thickening agent such as starch, which is decomposable by amylase, this enzyme being the product for decomposing the thickening agent.

In order to prevent the enzyme from decomposing any solid starch-containing material which is part of the composite bulk material, the enzyme is preferably inactivated after its action of substantially decomposing the thickening agent. This inactivation can be achieved by heating of the portions above the inactivation temperature of the enzyme, which temperature may be above room temperature, for example, during a cooking or sterilizing operation of the portions, or the inactivation can be achieved by an inactivation agent which is added in such a way that it will exert its action at the right moment. For inactivating an enzyme such as alpha-amylase, the pH may be lowered below 4.5, for example by means of an acid. In a preferred embodiment of the present invention a series of containers is produced, each containing a liquid phase of low viscosity when in the ready-for-use condition and particulate solid material in substantially the same ratio, by the step of preparing a composite bulk material of the said liquid phase and the said solid material together with a decomposable thickening agent such that during dividing of the bulk material homogenization is substantially maintained, the step of filling each container with the thus thickened homogeneous composite bulk and the step of subsequently decomposing the thickening agent in each container. Thus a series of containers can be produced filled with for example soup composed of a water phase soup base of low viscosity when in the ready-for-use condition (without or with dilution) and particulate solid soup material such as noodles, macaroni, vegetables, meat, in substantially the same ratio.

It is clear that also in this embodiment the disintegration of the thickener has to take place substantially after the filling has been accomplished, for example by heating of the container after filling It is to be understood that when using heat-labile thickening agent, it is essential, in order to obtain a product with a satisfactory viscosity, to decompose the thickening agent, for instance during sterilization, before the portions are finally prepared in the household.

As thickening agents which are decomposed by heat, for example at sterilization temperatures, alginates and tragacanth have proved to be operative.

Those skilled in the art will know which thickening agents are decomposable by heat under certain conditions of temperature and time of heating.

When using an enzyme for the disintegration, the enzyme has preferably to be added to each container, for example to each portion separately after the portions have been measured out or during the measuring out, or to each container separately before being filled.

The enzyme is preferably added in solution, the quantity of solution being so chosen that easy mixing will occur with the product. Another method of adding the enzyme to the bulk material is to use it encapsulated, for example as microcapsules. The capsules should be capable of melting or dissolving in order to exert the decomposing action of the enzyme on the thickening agent. This melting or dissolving must take place at a temperature below the inactivating temperature of the enzyme.

Enzymes which are suited to decompose an appropriate enzyme decomposable thickening agent are for example amylase, mannohydrolase, cellulase, alginate glucanohydrolase, proteinase and pectinase. Combinations of thickening agent and enzyme which have proved to be operative are starch and alpha-amylase, guar gum and beta 1-4 mannohydrolase, which can be obtained for example from sprouted guar beans, locust bean flour and beta 1-4 mannohydrolase, carboxymethylcellulose and beta 1-4 glucan-4 glucanohydrolase, alginates and alginate glucanohydrolase, gelatin and pancreas proteinase and low methoxy pectine and pectinase.

Those skilled in the art will know which enzyme is suitable to decompose a particular thickening agent. For example, other enzymes suitable for decomposing gelatin are bromelin, papain and trypsin. An appropriate reference is for instance Volume 8, 2nd Ed. of Kirk-Othmer's "Encyclopedia of chemical Technology", page 173 ff, Interscience Publishers.

It is important that a good mixing of the enzyme with the product is obtained. In the commercial conveying systems this is generally the case. Otherwise a mixing device has to be used after the filling operation. A thickening agent which may be readily used, and which is of particular importance in the case of soups, is starch (for example wheat flour or potato starch). An enzyme which can be used with advantage to break down this thickening agent is alpha-amylase. This alpha-amylase can be obtained as a commercial product of microbiological origin. Another source of alpha-amylase is malt. The malt may be used as such; for example, a suspension of malt flour in water can be made and this suspension kept at 50°C. for 1 hour to extract the enzyme. This suspension or solution may be used.

Sometimes, as in the case of soups which contain noodles or other particulate starchy material and in which alpha-amylase is used, care has to be taken that the effect of the enzyme activity is not too great (overdosing has to be avoided), otherwise the noodles etc. may disintegrate and cause an unwanted turbidity or may stick together. For this reason the quantity of alpha-amylase has to be judicially chosen. Therefore, in each case in which the composite bulk contains particulate solid material which is desired in the end product to be unaffected by the enzyme, care has to be taken that the enzyme cannot substantially decompose the solid material; to this end an enzyme used in a judicially chosen quantity has to be selected which is inactivated, for example by sterilization of the filled containers.

Generally speaking, the quantity of enzyme used and the time and temperature during which it is active have to be chosen such as to obviate undesirable side effects and to obtain the viscosity ultimately desired. Inactivation may also be obtained by heating for a certain time above the inactivation temperature of the particular enzyme at issue.

In the case of soups the bulk material is first cooked in kettles. Then generally the temperature is allowed to drop before the filling operation, in most cases to about 70°C.

After the filling operation the alpha-amylase will be active on the gelatinised starch in the containers till the inactivation temperature is reached during the warming-up period of the sterilization process. For malt alpha-amylase this inactivation temperature is about 80° to 85°C. at a neutral pH. Consequently, when the filled containers are sterilized, for example at 110°C., the alpha-amylase will be inactivated. The inactivating temperature depends on the type (origin) of the alpha-amylase, pH, the salt concentration etc. Also when the inactivating temperature of the alpha-amylase is high, usually less activity will be required, since during the warming-up operation to the sterilization temperature the enzyme can exert its action for a longer period.

Generally the quantity of starch used in soups will be between 10 and 40 g./l. The quantity of the enzyme to be used depends on the kind of enzyme and the process as such, Usually the process is conducted in such a way that the viscosity of the liquid phase in ready-for-consumption condition of the end product will be decreased to between 1 and 20, usually between 1 and 10, preferably between 1 and 5 cp measured at 60°C. with an Epprecht viscometer.

A very important advantage of the process according to the invention is obtained when, as in the case of soups, for example, after the filling and closing of the containers is that the sterilization time can be substantially reduced by lowering the viscosity of the contents. A reduced sterilization time does not only increase the economy of the process, but also decreases organoleptic impairment by the action of heat.

When starch is used as a thickening agent, another advantage presents itself in the case of clear soups. Normally such soups become turbid possibly due to retrogradation of the starch after sterilization, and the turbidity tends to increase during the shelf life of the soup. When the starch as been enzymatically broken down, this retrogradation does not take place and the soup will remain clear.

EXAMPLE 1

A concentrated chicken soup, containing broth, spices, salt and meat extract, was prepared in a normal way with 50 L g. vermicelli, 60 g. cubes of chicken meat of about 15 × 15 × 15 mm. and 28 gr. potato starch per litre. After preparation and before filling into the half-litre cans, the temperature of the soup was 70°C.

Just before filling each can of 500 ml. capacity, 10 ml. solution containing 3 mg. of bacterial alpha-amylase, activity 2,500 S.K.B. * units/g. amylase was injected. After filling with the soup the cans, each containing substantially the same amount of ingredients, were closed and in the normal way conveyed to the loading station. During this transport over several conveyors a good mixing was obtained. At 20 minutes after the first can and 10 minutes after the last can had been closed, autoclaving was started at a temperature of 118°C. The required sterilization time was 15 minutes. (A control without addition of alpha-amylase required 60 minutes' sterilization.) After sterilization the soup was water-thin and clear, whereas the control was turbid and rather thick.

EXAMPLE 2.

A concentrated chicken soup was prepared according to the recipe of example 1. However the soup was frozen to blocks after which the enzyme was added by spraying 1 ml. solution of alpha-amylase (10 S.K.B.*) over the surface of each ½ litre of the frozen soup. The blocks were divided into portions. After thawing and cooking the soup was water-thin.

*S.K.B. is the universally accepted method for determining alpha-amylase activity according to Aanstedt, Kneen and Elish, Cereal Chemistry (1939) 16, 712.

EXAMPLE 3

The same process was carried out as in example 1, but with vegetable soup, containing spices, meat extract and salt besides 52 g. vermicelli, 24 meatballs, 40g. green peas, 20 g. French beans, 26 g. carrot cubes (10 × 10 × 3 mm.) and with 20 g. potato starch per litre. After filling, each tin contained no appreciably different amounts of ingredients. The sterilization time in this case was 25 minutes (whereas the control required 75 minutes.) After sterilization the soup was water-thin and clear (whereas the control was turbid and rather thick). The flavor was also improved over the control.

EXAMPLE 4

The same process was carried out as in example 1, but the 10 ml. solution added contained 300 mg. of malt flour instead of 3 mg. of bacterial alpha-amylase. The required sterilization time was 15 minutes at 118°C. Again the soup was water-thin and clear after sterilization.

EXAMPLE 5

The same process was carried out as in example 3 but the 10 ml. solution added contained 300 mg. of malt flour instead of 3 mg. of bacterial alpha-amylase. The required sterilization time was 15 minutes at 118°C. Again the soup was water-thin after sterilization.

EXAMPLES 6 and 7

The same soups as in examples 1 and 3 were subdivided into portions but instead of potato cross-linked 40 gr. gelatin per litre was added as the thickening agent; filling was carried out at room temperature. Instead of amylase, after filling 6 mg./litre pancreas proteinase was added. The gelatin was quickly degraded.

EXAMPLES 8 and 9

The same soups as in examples 1 and 3 were subdivided into portions, but low methoxy pectin, cross-linked by the addition of 0.1percent $CaCl_2.6H_2O$, was used as the thickening agent. After filling at 65°C. the addition of 6 mg./litre pectinase resulted in complete breakdown of the pectine.

What is claimed is:

1. A process for subdividing a substantially water-thin bulk food material having an aqueous phase and a particulate solid phase into portions having substantially the same composition as said bulk food material, comprising the steps of mixing said aqueous and particulate phases with a thickening amount of a decomposable thickening agent distributing said solid phase substantially uniformly throughout said aqueous phase, thereby forming a thickened bulk material of uniform particulate solids content, subdividing said thickened bulk material into portions, each having substantially the same relative proportions of aqueous and particulate phases, and subsequently decomposing the thickening agent, thereby converting said portions into a ready-for-use condition.

2. A process for subdividing a substantially water-thin bulk food material having an aqueous phase and a particulate solid phase into portions having substantially the same composition as said bulk food material comprising the steps of mixing said aqueous and particulate phases with a thickening amount of an enzyme-decomposable thickening agent, distributing said solid phase substantially uniformly throughout said aqueous phase, thereby forming a thickened bulk material of uniform particulate solids content, subdividing said thickened bulk material into portions each having substantially the same relative proportions of aqueous and particulate phases and subsequently decomposing the thickening agent by an enzyme, thereby converting said portions into a ready-for-use -use condition.

3. A process according to claim 2, wherein the enzyme-decomposable thickening agent is selected from the group consisting of starch, guar gum, locust bean flour, carboxymethylcellulose, alginates, gelatin and low methoxy pectine.

4. A process according to claim 2, wherein the enzyme-decomposable thickening agent and the enzyme decomposing said thickening agent are employed in combinations selected from the group consisting of starch and alpha-amylase, guar gum and beta 1 –4 mannohydrolase, locust bean flour and beta 1–4 glucan-4 glucanohydrolase, alginates and alginate glucanohydrolase, gelatin and pancreas proteinase and low-methoxy pectine and pectinase.

5. A process according to claim 2, wherein alpha-amylase is added in an isolated form to the bulk food material containing starch as the thickening agent and said starch is decomposed subsequent to subdividing the bulk food material into portions by activation of said amylase.

6. A process according to claim 2, wherein alpha-amylase isolated by a coating of capsular material is added to the bulk food material containing starch as the thickening agent, the bulk food material is subdivided into portions, and the enzyme is activated by dissolution of the capsular material thereby decomposing the thickening agent in each portion.

7. A process according to claim 2, wherein the thickening agent is starch, and alpha-amylase is mixed with the food material after subdivision into portions, thereby decomposing the thickening agent.

8. A process according to claim 2 wherein the thickening agent is starch, and the portions are converted to the form required for consumption by decomposing said starch with alpha-amylase and which is subsequently inactivated.

9. A process for subdividing a substantially water-thin bulk food material having an aqueous phase and a particulate solid phase into portions having substantially the same composition as said bulk food material comprising the steps of mixing said aqueous and particulate phases with a thickening amount of a heat-labile thickening agent, distributing said solid phase substantially uniformly throughout said aqueous phase, thereby forming a thickened bulk food material of uniform particulate solids content, subdividing said thickened bulk material into portions, each having substantially the same relative proportions of aqueous and particulate phases and subsequently decomposing the thickening agent by heating the subdivided portions of the bulk food material, thereby converting said portions into a ready-for-use condition.

10. A process according to claim 9, wherein the heat-labile thickening agent is selected from the group consisting of alginates and tragacanth.